UNITED STATES PATENT OFFICE.

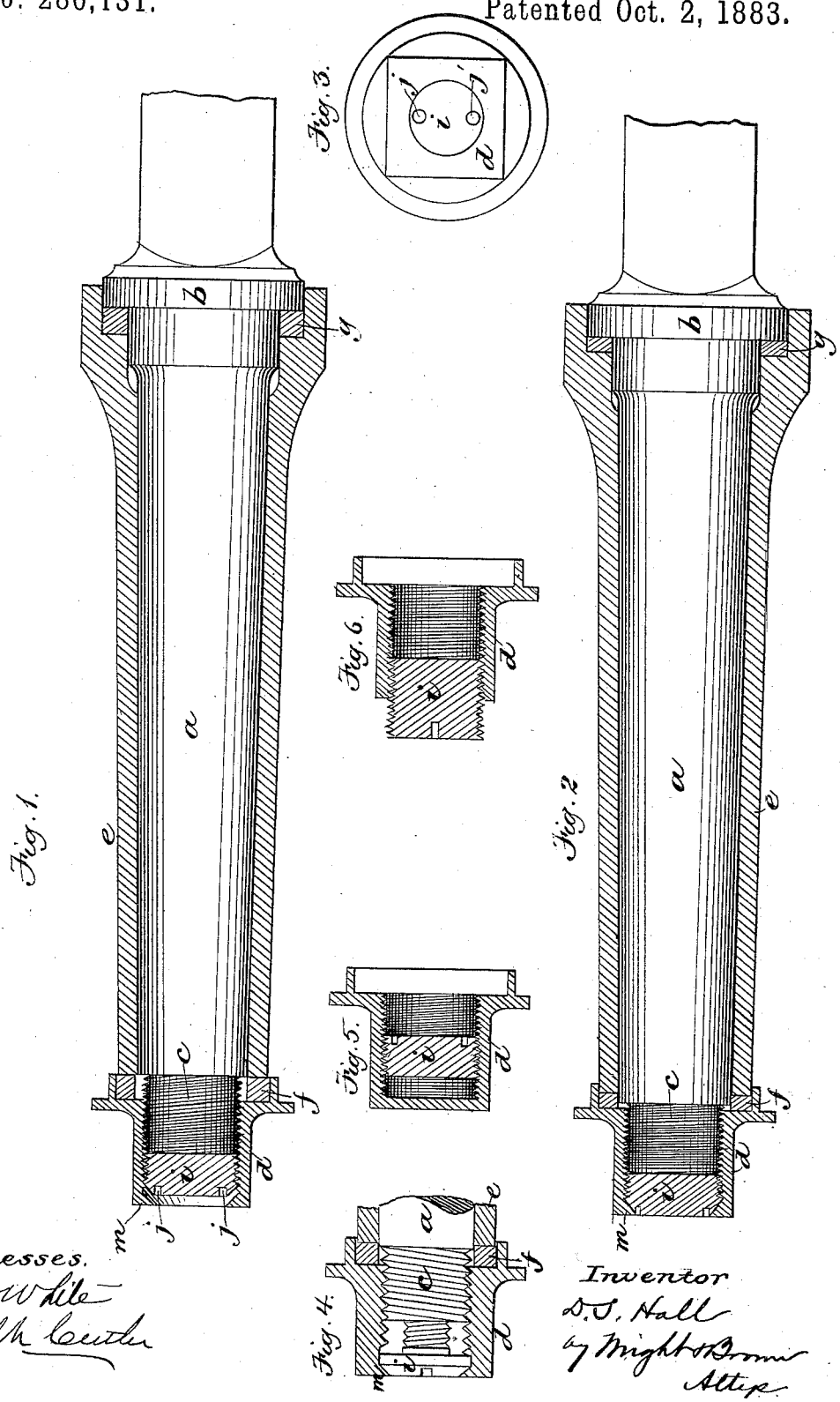

DAVID S. HALL, OF STOUGHTON, MASSACHUSETTS.

CARRIAGE-AXLE NUT.

SPECIFICATION forming part of Letters Patent No. 286,131, dated October 2, 1883.

Application filed June 16, 1883. (No model.)

*To all whom it may concern:*

Be it known that I, DAVID S. HALL, of Stoughton, in the county of Norfolk and State of Massachusetts, have invented certain Improvements in Axles and Axle-Nuts, of which the following is a specification.

This invention has for its object to prevent the nut which secures the hub on an ordinary carriage-axle spindle from binding on the washers placed at the opposite end of the hub or box, and also to enable the wear of said washers to be compensated for.

To these ends my invention consists in certain details of construction, all of which I will now proceed to describe and claim.

Of the accompanying drawings, forming a part of this specification, Figures 1 and 2 represent side elevations of a carriage-axle with the box and nut in section, the nut showing one form of my invention, and being differently adjusted in the two figures. Fig. 3 represents an end view of the same. Figs. 4, 5, and 6 represent views of modifications.

The same letters of reference indicate the same parts in all the figures.

In the drawings, $a$ represents one of the hub-supporting spindles of a carriage-axle, having at its inner end a shoulder, $b$, and at its outer end a reduced threaded extremity, $c$.

$d$ represents the axle-nut, and $e$ represents the pipe or box of the hub interposed between the shoulder $b$ and nut $d$, and having at its opposite ends the usual washers, $f\ g$, of leather or other suitable material, interposed the one between the outer end of the box and the nut $d$ and the other between the inner end of the box and the shoulder $b$.

In carrying out my invention I interpose between the extreme outer end of the threaded extremity $c$ of the spindle and the outer portion of the nut $d$ an adjustable check or bearing, $i$, whereby the entire pressure of the nut, when it is screwed firmly home, is supported by the end of the spindle, and not by the washer $f$, and through the latter by the box and the inner washer, $g$, as heretofore. Said check or bearing may be made in different forms and supported either by the nut or by the spindle, preferably the former. I prefer the form shown in Figs. 1, 2, and 3, in which the check $i$ is an externally-threaded plug screwed into the internally-threaded socket or interior of the nut $d$, and provided with orifices $j\ j$ in its outer end, or, if preferred, with a single slot, like a screw-head, to permit a screw-driver to be engaged with and rotate said plug. The check or plug $i$ bears on the outer end of the reduced extremity $c$ when the nut $d$ is screwed firmly home, and thus enables the axle to support the entire pressure of the nut, and by its adjustability enables the surface of the nut which bears against the washer $f$ to bear lightly against said washer when the nut is screwed tightly against the axle. The nut is thus adjusted to the thickness of both washers, so that there will be no endwise play of the box $e$ between them, and no crevices for the admission of sand and dirt, and at the same time no binding-pressure of the nut and box against the washers, such as would be likely to cause heating of the box and unscrewing of the nut in backing the carriage. Variation in the thickness of the washers, caused by wear, is also compensated for, as shown by a comparison between Figs. 1 and 2. The outer end of the nut $d$ is open, so that the plug or check $i$ can be turned for adjustment without removing the nut from the axle. The opening in the outer end of the nut is surrounded by a flange, $m$, which makes said opening smaller than the plug or check, so that the latter cannot be separated or lost from the nut while the latter is in place on the axle.

Fig. 4 shows the check $i$ in the form of the head of a screw inserted in a threaded socket in the extremity $c$ of the axle-spindle, the nut being constructed with the flange $m$, as shown in Figs. 1 and 2, to prevent withdrawal of the check. In this case the thread of said screw has an opposite pitch to that of the extremity $c$ of the axle-spindle.

I am aware of Patent No. 73,530, which shows a carriage-axle nut provided with a stop. This stop differs from mine, in that it is liable to be removed from the nut from the outer end. Other modifications shown in my drawings are old, and I do not claim them.

I claim—

The combination of a hub or axle-box, an axle-spindle constructed as described, and a nut adapted to screw on the threaded end of said spindle, said nut having an inturned rim at the outer end, and an interior check-nut capable of adjustment within the said first-mentioned nut, substantially as described.

In testimony whereof I have signed my name to this specification, in the presence of two subscribing witnesses, this 9th day of June, 1883.

DAVID S. HALL.

Witnesses:
C. F. BROWN,
A. L. WHITE.